(12) United States Patent
Anderson et al.

(10) Patent No.: US 6,195,403 B1
(45) Date of Patent: *Feb. 27, 2001

(54) PULSE GENERATOR FOR A VOLTAGE CONTROLLED OSCILLATOR

(75) Inventors: Richard Eugene Anderson, Jericho, VT (US); Eric Michael Foster, Owego, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,306

(22) Filed: Sep. 26, 1997

(51) Int. Cl.[7] .............................. H03D 3/24; H04N 9/475
(52) U.S. Cl. ........................................... 375/376; 348/512
(58) Field of Search .................................. 375/340, 354, 375/376, 373; 348/512, 500

(56) References Cited

U.S. PATENT DOCUMENTS

| | | | |
|---|---|---|---|
| 5,365,272 | 11/1994 | Siracusa | 348/426 |
| 5,381,181 | 1/1995 | Deiss | 348/423 |
| 5,425,101 | 6/1995 | Woo et al. | 380/23 |
| 5,502,493 | 3/1996 | Meyer | 348/845 |
| 5,506,904 | 4/1996 | Sheldrick et al. | 380/23 |
| 5,517,250 | 5/1996 | Hoogenboom et al. | 348/845.1 |
| 5,521,922 | 5/1996 | Fujinami et al. | 370/543 |
| 5,559,999 | 9/1996 | Maturi et al. | 713/400 |
| 5,566,089 | 10/1996 | Hoogenboom | 358/1.15 |
| 5,594,492 | 1/1997 | O'Callaghan et al. | 348/10 |
| 5,594,660 | 1/1997 | Sung et al. | 345/302 |
| 5,596,581 | 1/1997 | Saeijs et al. | 370/394 |
| 5,602,920 | * 2/1997 | Bestler et al. | 380/212 |
| 5,612,981 | 3/1997 | Huizer | 375/376 |
| 5,619,501 | 4/1997 | Tamer et al. | 370/392 |
| 5,699,392 | * 12/1997 | Dokic | 375/376 |
| 5,768,326 | * 6/1998 | Koshiro et al. | 375/376 |
| 5,771,075 | * 6/1998 | Rim et al. | 348/512 |
| 5,784,119 | * 7/1998 | Noda et al. | 348/512 |
| 5,832,256 | * 11/1998 | Kim | 713/501 |
| 5,881,114 | * 3/1999 | Moon | 375/376 |
| 5,896,388 | * 4/1999 | Earnest | 370/395 |
| 6,028,648 | * 2/2000 | Yu | 348/845.3 |

OTHER PUBLICATIONS

IBM TDB vol. 3A, No. 04, Apr. 1996 "Design Architecture for MPEG2 Transport Demultiplexor Assist", by Abdulhafiz et al.
"Digital Video: An Introduction to MPEG–2", by Haskell et al. Copyright 1997 by Chapman & Hall.
"MPEG Video Compression Standard" edited by Mitchell, et al. Copyright 1997 by Chapman and Hall.
"Digital Consumer Electronics Handbook" by Jurgen Copyright 1997 McGraw–Hill.
ISO/IEC 13818–1 "Information Technology—Generic Coding of Moving Pictures and Associated Audio: Systems" NO801 Nov. 13, 1994.

* cited by examiner

Primary Examiner—Tesfaldet Bocure
(74) Attorney, Agent, or Firm—McGuireWoods, LLP; William H. Steinberg

(57) ABSTRACT

A method of generating a pulse input to a voltage controlled oscillator of a digital decoder. The decoder has a system time clock (STC) counter and a Pulse Control Register. The method of generating the pulse input starts from the output of the STC counter and the output of the Pulse Control Register. These two outputs are logically combined and latched.

11 Claims, 7 Drawing Sheets

PULSE GENERATOR FOR A VOLTAGE CONTROLLED OSCILLATOR

FIELD OF THE INVENTION

This invention relates to digital delivery systems, especially for digital video and digital audio data. More particularly, the invention relates to multiplexors, networks, distribution systems, demultiplexors, and multiplexed bitstreams, and especially to bitstreams carrying a system or transport layer, and one or more data layers of compressed digital video and digital audio data. More particularly, the invention relates to system clock recovery for program synchronization, and more particularly to pulse generators for controlling voltage controlled oscillators used for program synchronization.

BACKGROUND OF THE INVENTION

Within the past decade, the advent of world-wide electronic communications systems has enhanced the way in which people can send and receive information. Moreover, the capabilities of real-time video and audio systems have greatly improved in recent years. Real-time video and audio systems require a large bandwidth. In order to provide services such as video-on-demand and videoconferencing to subscribers, an enormous amount of network bandwidth is required. In fact, network bandwidth is often the main inhibitor to the effectiveness of such systems.

In order to minimize the effects of the constraints imposed by the limited bandwidths of telecommunications networks, compression systems and standards have evolved. These standards prescribe the compression of video and audio data and the delivery of several programs and control data in a single bit stream transmitted in a bandwidth that would heretofore only accomodate one analog program.

One video and audio compression standard is the Moving Picture Experts Group ("MPEG") standard. Within the MPEG-2 standard, video compression is defined both within a given picture, i.e., spatial compression, and between pictures, i.e., temporal compression. Video compression within a picture is accomplished by conversion of the digital image from the time domain to the frequency domain by a discrete cosine transform, quantization, variable length coding, and Huffman coding. Video compression between pictures is accomplished via a process referred to as motion compensation, in which a motion vector is used to describe the translation of a set of picture elements (pels) from one picture to another. Audio compression is as defined in the standard.

The procedure for transporting the compressed bitstream from the transmitting end to the receiving end of the system, and for thereafter decompressing the bitstream at the receiving end, so that one of the many picture sequences is decompressed and may be displayed in real-time is specified in ISO 13818-1. ISO 13818-1 is the systems or transport layer portion of the MPEG-2 standard. This portion of the standard specifies packetization of audio and video elementary bitstreams into packetized elementary streams (PES), and the combinations of one or more audio and video packetized elementary streams into a single time division or packet multiplexed bitstream for transmission and the subsequent demultiplexing of the single bitstream into multiple bitstreams for decompression and display. The single time division or packet multiplexed bit stream is as shown from various architectural and logical perspectives in the FIGURES, especially FIGS. 1 to 5, where many packets make up a single bitstream.

The concept of packetization and the mechanism of packet multiplexing are shown in FIG. 1, denominated "Prior Art", where elementary streams are formed in an audio 120 encoder, a video encoder 121, a source of other data 122, and a source of systems 123 data. These elementary streams are packetized into packetized elementary streams, as described hereinbelow. The packetized elementary streams of audio data, and video data, and the packets of other data and systems data are packet multiplexed by the multiplexor into a system stream.

The time division or packet multiplexed bitstream is shown, for example, in FIGS. 2 and 5, both denominated "Prior Art", which gives an overview showing the time division or packet multiplexed bitstream. The bitstream is comprised of packets, as shown in FIG. 5. Each packet, as shown in FIG. 2, is, in turn, made up of a packet header, an optional adaptation field, and packet data bytes, i.e., payload.

The MPEG-2 System Layer has the basic task of facilitating the multiplexing of one or more programs made up of related audio and video bitstreams into a single bitstream for transmission through a transmission medium, and thereafter to facilitate the demultiplexing of the single bitstream into separate audio and video program bitstreams for decompression while maintaining synchronization. By a "Program" is meant a set of audio and video bitstreams having a common time base and intended to be presented simultaneously. To accomplish this, the System Layer defines the data stream syntax that provides for timing control and the synchronization and interleaving of the video and audio bitstreams. The system layer provides capability for (1) video and audio synchronization, (2) stream multiplex, (3) packet and stream identification, (4) error detection, (5) buffer management, (6) random access and program insertion, (7) private data, (8) conditional access, and (9) interoperability with other networks, such as those using asynchronous transfer mode (ATM).

An MPEG-2 bitstream is made up of a system layer and compression layers. Under the MPEG-2 Standard (ISO/IEC 13818-1) a time division or packet multiplexed bit-stream consists of two layers, (1) a compression layer, also referred to as an inner layer, a payload layer, or a data layer, and (2) a system layer, also referred to as an outer layer or a control layer. The compression layer or inner layer contains the data fed to the video and audio decoders, and defines the coded video and audio data streams, while the system layer or outer layer provides the controls for demultiplexing the interleaved compression layers, and in doing so defines the functions necessary for combining the compressed data streams. This is shown in FIG. 3, denominated "Prior Art." As there shown a bitstream of, for example, a system layer and compression layer, is the input to a system 131 decoder. In the system decoder the system layer data is demultiplexed into the compressed audio layer 132, the compressed video layer 132, and control data. The control data 134 is shown in FIG. 3, denominated Prior Art, as the PCR (Program Clock Recovery) data 135, enable data 136, and start up values 137. The compressed data is sent to the respective audio and video data buffers 138, 139, and through decoder control 140, 141 to the respective audio and video decoders 150, 151.

The system layer supports a plurality of basic functions, (1) time division or packet multiplexing and demultiplexing of the time division or packet multiplexed multiple bit-streams, (2) synchronous display of the multiple coded bit streams, (3) buffer management and control, and (4) time recovery and identification. The system layer also supports (5) random access, (6) program insertion, (7) conditional access, and (8) error tracking.

For MPEG-2, the standard specifies two types of layer coding, a program stream (PS), for relatively lossless environments, such as CD-ROMs, DVDs, and other storage media, and transport stream (TS), for lossy media, as cable television, satellite television, and the like. The transport stream (TS), shown in FIG. 2 and denominated Prior Art, consists of a stream of transport stream packets, each of which consists of 188 bytes, divided into 4 bytes of packet header, an optional adaptation field, and up to 184 bytes of the associated packet data, that is, payload. The relationship of the layering of the access units, the PES packets, and the Transport Stream (TS) packets is shown in FIG. 5, denominated Prior Art.

The transport stream (TS) is used to combine programs made up of PES-coded data with one or more independent time bases into a single stream. Note that under the MPEG-2 standard, an individual program does not have to have a unique time base, but that if it does, the time base is the same for all of the elements of the individual program.

The packetized elementary stream (PES) layer is an inner layer portion of the MPEG-2 time division or packet multiplexed stream upon which the transport or program streams are logically constructed. It provides stream specific operations, and supports the following functions: (1) a common base of conversion between program and transport streams, (2) time stamps for video and audio synchronization and associated timing, especially for associated audio and video packets making up a television channel, presentation, or program, and having a common time base, (3) stream identification for stream multiplexing and demultiplexing, and (4) such services as scrambling, VCR functions, and private data.

As shown in FIG. 5, denominated Prior Art, video and audio elementary streams (ES) must be PES-packetized before inserting into a transport stream (TS). Elementary streams (ES) are continuous. PES packets containing an elementary stream (ES) are generally of fixed lengths. Typically, video PES packets are on the order of tens of thousands of bytes, and audio PES packets are on the order of thousands of bytes. However, video PES packets can also be specified as of undefined length.

The MPEG-2 packetized elementary stream (PES) packet structure is shown in FIG. 4. To be noted is that all of the fields after the PES packet length are optional. The PES (packetized elementary stream) packet has a PES header, an optional header, and payload. The PES header has bit start code, a packet length field, a 2 bit "10" field, a scramble control field, a priority field, a data alignment field, a copy field, a PTS/DTS (Presentation Time Stamp/Decoding Time Stamp) field, a field for other flags, and a header length field.

The "Optional Header" field includes a Presentation Time Stamp field, a Decoding Time Stamp field, an elementary stream clock reference field, a elementary stream rate field, a trick mode field, a copy info field, a Prior Packetized Elementary Stream Clock Recovery field, an extension, and stuffing.

The packet start code provides packet synchronization. The stream ID field provides packet identification. Payload identification is also provided by the stream ID. The PTS/DTS flag fields and the PTS/DTS fields provide presentation synchronization. Data transfer is provided through the packet/header length, payload, and stuffing fields. The scramble control field facilitates payload descrambling, the extension/private flag fields and the private data fields provide private information transfer.

A transport stream (TS) may contain one or more independent, individual programs, such as individual television channels or television programs, where each individual program can have its own time base, and each stream making up an individual program has its own PID. Each separate individual program has one or more elementary streams (ES) generally having a common time base. To be noted, is that while not illustrated in the FIGURES, different transport streams can be combined into a single system transport stream. Elementary stream (ES) data, that is, access units (AU), are first encapsulated into packetized elementary stream (PES) packets, which are, in turn, inserted into transport stream (TS) packets, as shown in FIG. 5, denominated Prior Art.

The architecture of the transport stream (TS) packets under the MPEG-2 specifications is such that the following operations are enabled: (1) demultiplexing and retrieving elementary stream (ES) data from one program within the transport stream, (2) remultiplexing the transport stream with one or more programs into a transport stream (TS) with a single program, (3) extracting transport stream (TS) packets from different transport streams to produce another transport stream (TS) as output, (4) demultiplexing a transport stream (TS) packet into one program and converting it into a program stream (PS) containing the same program, and (5) converting a program stream (PS) into a transport stream (TS) to carry it over a lossy medium to thereafter recover a valid program stream (PS).

At the transport layer, the transport sync byte provides packet synchronization. The Packet Identification (PID) field data provides packet identification, demultiplexing, and sequence integrity data. The PID field is used to collect the packets of a stream and reconstruct the stream. The continuity counters and error indicators provide packet sequence integrity and error detection. The Payload Unit start indicator and Adaptation Control are used for payload synchronization, while the Discontinuity Indicator and Program Clock Reference (PCR) fields are used for playback synchronization. The transport scramble control field facilitates payload descrambling. Private data transfer is accomplished through the Private Data Flag and Private Data Bytes. The Data Bytes are used for private payload data transfer, and the Stuffing Bytes are used to round out a packet.

Achieving and maintaining clock recovery and synchronization is a problem, especially with audio and video bitstreams. The MPEG-2 model assumes an end-to-end constant delay timing model in which all digital image and audio data take exactly the same amount of time to pass through the system from encoder to decoder. The system layer contains timing information that requires constant delay. The clock references are Program clock reference (PCR) and the time stamps are the Presentation Time Stamp/Decoding Time Stamp(PTS/DTS).

The decoder employs a local system clock having approximately the same 27 Megahertz frequency as the encoder. However, the decoder clock can not be allowed to free run. This is because it is highly unlikely that frequency of the decoder clock would be exactly the same as the frequency of the encoder clock.

Synchronization of the two clocks is accomplished by the Program Clock Reference (PCR) data field in the Transport Stream adaptation field. The Program Clock Reference values can be used to correct the decoder clock. Program Clock Reference, or PCR, is a 42 bit field. It is coded in two parts, a PCR Base having a 33-bit value in units of 90 kHz, and a PCR extension having a 9-bit extension in units of 27 MHz, where 27 MHz is the system clock frequency.

As a general rule, the first 42 bits of the first PCR received by the decoder initialize the System Time Clock (STC) counter 141 for clock recovery, and subsequent PCR values are compared to the STC to make adjustments to the clock recovery algorithms. The difference between the PCR and the local clock can be used to drive a voltage controlled oscillator 142, or a similar device or function, for example, to speed up or slow down the local clock driving the STC.

Audio and video synchronization is typically accomplished through the Presentation Time Stamp (PTS) inserted in the Packet Elementary Stream (PES) header. The Presentation Time Stamp is a 33-bit value in units of 90 kHz, where 90 kHz is the 27 MHZ system clock divided by 300. The PTS value indicates the time that the presentation unit should be presented to the user.

Digital video systems, such as MPEG-2 systems, DSS systems, ETSI DVB systems, and HDTV systems, which carry digital video and digital audio programs over a transmission medium, as satellite or cable, require that the clock at the source and the clock at the receiver have the same frequency. If the frequency at the receiver is slower than that at the source, video and audio frames will be discarded, resulting in picture and sound degradation. Similarly, if the receiver's clock is faster, the receiver will have to repeat video pictures and audio frames. Also resulting in picture and sound degradation.

The MPEG-2 standard specifies a series of time references (PCRs) to allow the receiver's clock frequency to be adjusted to match the source frequency. In order to attain and hold this match in clock frequency the receiver must have a very stable clock, such as a voltage controlled oscillator. Typically, MPEG-2 and HDTV set top boxes have a frequency of 27 MHz to within 50 parts per million.

The signal to control present voltage controlled oscillators (VCXO) is typically generated by a Pulse Width Modulator (PWM) signal using two counters, each 8 to 14 bits in size. For example, one of the counters controls the period of the signal, while the other controls the duty cycle. It is to be noted that other counter implementations are possible. A larger pair of counters would provide finer control of the pulse width, but at the expense of more logic.

Thus, a clear need exists for generating the PWM signal while eliminating the two counters.

OBJECTS OF THE INVENTION

It is an object of the invention to provide a pulse generator for controlling a voltage controlled oscillator.

SUMMARY OF THE INVENTION

These and other objects of the invention are accomplished by the method and apparatus of the invention. The apparatus of the invention is embodied in a transport demultiplexor. The demultiplexor drives a voltage controlled oscillator through an apparatus for generating a pulse input to the voltage controlled oscillator. The demultiplexor has an STC counter and a Pulse Generator Control Register. The pulse input to the voltage controlled oscillator is generated by the logically combined output bits of the STC counter and output bits of the pulse generator control register. Downstream are latch means for latching the combinatorial result of output bits of the STC counter and output bits of the pulse control register. The output of the latch is recovered for transfer to the voltage controlled oscillator. In this way an existing counter is re-used for controlling the oscillator.

THE FIGURES

The invention may be understood by reference to the Figures.

FIG. 1 denominated Prior Art, shows the packet multiplexing of the transport stream.

FIG. 2, denominated "Prior Art", shows a schematic view of the transport packet stream with a 188 byte packet, a 4 byte header, an optional adaptation field, and payload, the payload being present if the adaptation field is less then 184 bytes.

FIG. 3, denominated "Prior Art", is a schematic view of the MPEG-2 system structure, showing the system decoder, i.e., a demultiplexor, demultiplexing the incoming bitstream into an audio compression layer for an audio buffer and decoder, a video compression layer for a video buffer and decoder, and PCR data for clock control.

FIG. 4, denominated "Prior Art", is a schematic view of the PES (packetized elementary stream) structure according to the MPEG-2 Standard, showing the PES header. The FIGURE shows the PES header broken into its separate fields, with a further breakdown of the Optional Header field, and a still further breakdown of the Extension field within the Optional Header field.

FIG. 5, denominated Prior Art shows the relationship of the layering of the access units, the PES packets, and the Transport Stream (TS) packets, with the encapsulation of elementary stream data into transport stream packets.

DETAILED DESCRIPTION OF THE INVENTION

The MPEG-2 transport bitstream is a set of time division or packet multiplexed bitstreams. Each such time division or packet multiplexed bitstream may contain a plurality of programs, that is, television channels, digital communications, or the like. Each bitstream contains a systems stream which provides systems layer functions for one or more audio and video elementary streams in the time division or packet multiplexed single stream. The single stream is as shown in FIGS. 1 to 5, denominated "Prior Art", where many packets make up the single bitstream. The single bitstream is a system layer. As shown generally in FIGS. 1 to 5, and with specificity in FIG. 2, the first level of granularity is a transport layer, made up of a 4 byte header, an optional adaptation field, and a payload (the payload is up to to 184 bytes if the adaptation field is less then 184 bytes). In turn, at the next level of granularity, each packet is made up of a packet header, and packet payload data bytes, which may be PES packets, table sections, or private data. The single bitstream is a system layer.

Figure 6:
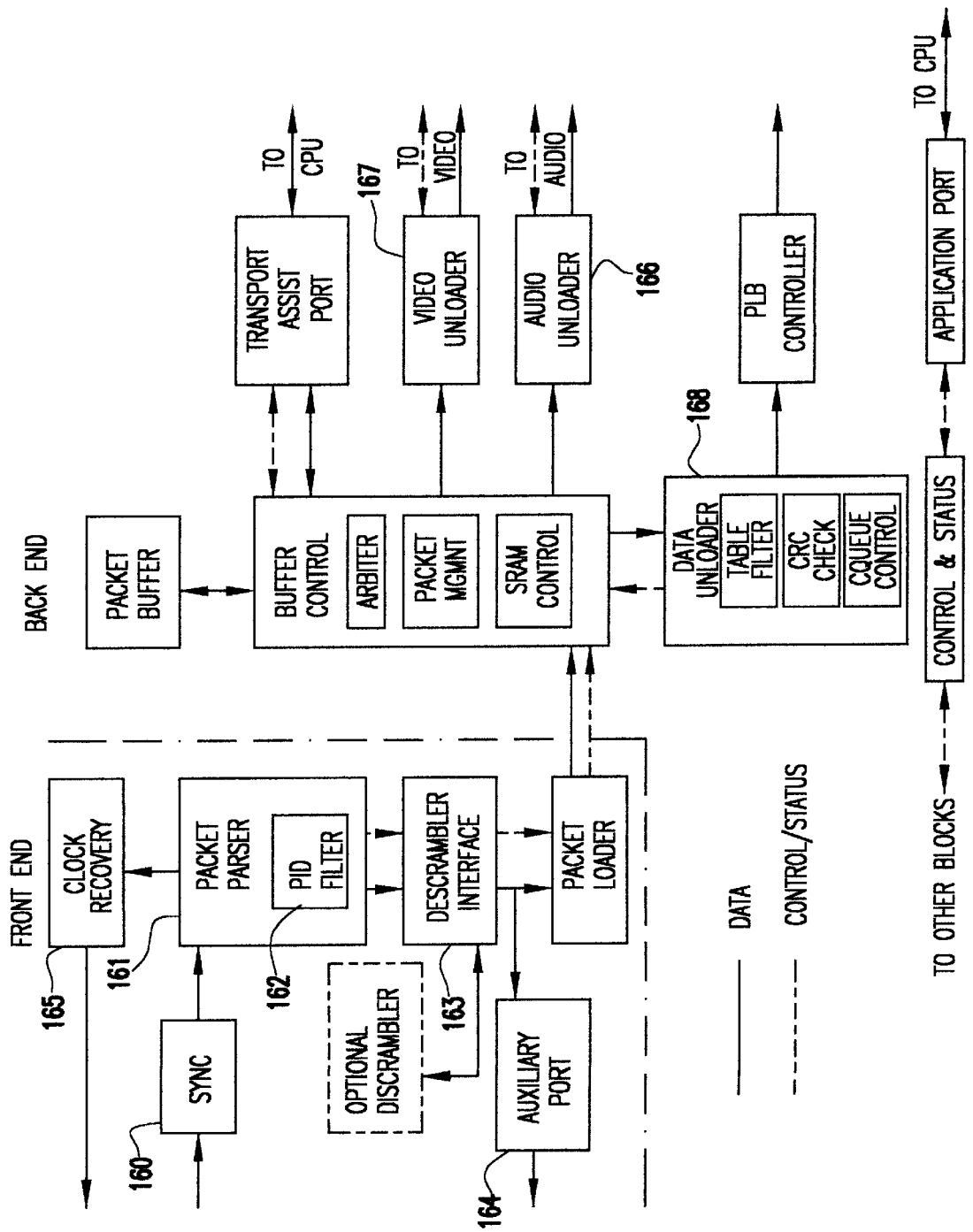
FIG. 6 shows the dataflow of the transport demultiplexor of the invention.

FIG. 6 represents the dataflow of transport stream data through the transport demultiplexor of the invention. The SYNC block 160 determines the start of the transport packet. The PACKET PARSER 161 extracts data from the transport packet header and adaptation field. The PID is one of these fields. The PID is compared to active PIDs in the PID filter 162. If the matches one of the predefined values, the remaining fields are extracted and the packet is forwarded to the descrambler interface 163 which will send filtered but scrambled data to a descrambler, if present. The descrambler, if present, descrambles and reconstructs the packets as configured by the application. The resulting stream is optionally forwarded to an auxiliary port 164 which provides means for other devices to obtain access to the data.

Concurrently, the packet parser sends PCRs from matching PCR packets to the clock recovery unit 165 for reconstructing the System Time Clock (STC).

Status indicators representing parsed information are sent along with the complete transport packet to the packet loader to be stored in the packet buffer. The packet buffer holds a plurality, for example up to ten or more, transport packets while they are moved to the decoders and the DRAM or other memory. The packet buffer efficiently absorbs any latency of these data targets.

The transport core contains three unloaders, an audio unloader 166, a video unloader 167, and a data unloader 168. The audio unloader and the video unloader send data to the respective decoders as the data is requested. The data unloader sends data to a PLB controller 170 for subsequent transfer to system memory. The memory unloader can also be set up to filter table sections and perform crc checking of section data.

According to the invention the transport demultiplexor accepts either parallel or serial data, detects the synchronization character in the datastream, and establishes transport packet boundaries therefrom. In the case of serial input, where only a bit clock is provided, the transport demultiplexor of the invention establishes byte alignment.

The Packet Parser 161 extracts Transport Error Indicator information from each packet, as well as the packet boundary information, and sends it to other units to assist in their processing. Some of the parsed information is stored in the packet buffer along with the packet for use by the unloaders.

If the packet parser detects the Transport Error Indicator is set, or that the sync byte is missing and the sync drop is greater then 0, or that the TS Error Signal is active, the packet is discarded. The Transport Packet Header, shown in FIG. 2 has a plurality of fields. One of the fields is a one bit Transport Error Indicator. Any packet with the Transport Error Indicator set to 1 is discarded. If the error occurred in a packet which would have matched a PID Filter entry, the continuity count check will mark the error in the next valid packet of the PID so that it can be masked by the decoders or managed by the Memory unloader. Thus, errors in packets which do not match entries in the PID Filter do not generate unnecessary events for the system to handle.

Transport packets containing PCRs may arrive with errors such as the Transport Error Indicator in the packet header. The PCR fields from errored packets are not used for clock recovery, the PCR field may be in error.

The value of the Payload Unit Start Indicator bit is forwarded to the unloaders through the packet buffer for use during packet unload to send the packetized elementary streams.

The Packet Parser incorporates a PID filter, such a 32 entry PID filter. The 13 bit PID value is sent to the PID filter to determine if a match occurs. Packets that match a PID filter entry are forwarded, while all other packets, including null packets, are discarded.

The transport demultiplexor of the invention further provides PID filtering. The PID filter registers and a corresponding PID enable register are used to control which packets are forwarded through the transport demultiplexor. A PID value should only appear once in the PID filter. There are up to 32 programmable PID values that are used to filter the transport stream. The PID filter associates a PID index, for example, a 5 bit PID index, with each of the 32 PID entries. One PID index is reserved for the video PID, and one for the audio PID. The other PID entries are defined by the application.

The front-end PID filtering logic filters incoming transport packets before they are placed in the packet buffer. Data from the PIDs, for example, data from up to about 32 different PIDs can be captured by the transport core or transport demultiplexor of the invention for delivery to the output ports. All other packets, including null packets, may be discarded.

A plurality of registers, for example, thirty two registers, are used to assign a PID index to each of the filtered packets to be delivered downstream, for example, to a descrambler and/or a decoder and/or a Packet Buffer. A PCR PID register holds the PCR PID value which can be the same or different from any of the general PID filter indices. If the PCR PID is not the same as one of the PID filter entries, then the PCR PID entries are not forwarded. Moreover, since the PCR PID filter is separate from the general PID filters, the STC can be started before the transport begins delivering data to the decoders.

When the datastream is scrambled, as would be the case for a scrambled European Telecommunications Standards Institute Digital Video Broadcasting (ETSI DVB) compliant stream, the two bit Transport Scrambling Control bits are extracted and sent to the descrambler, if present.

The two bit Adaptation Field Control Field is used to determine if an adaptation field and/or a payload is present. If an adaptation field is present, the adaptation field parsing described hereinbelow is performed. Packets with an adaptation field control value of "00" are discarded. A value of "01" indicates that there is no adaptation field, only payload. A value of "10" indicates that there is an adaptation field only, and no payload, while a value of "11" indicates that there is an adaptation field followed by payload.

The 4-bit Continuity Counter field is maintained for each enabled PID index to detect any missing data in the payload stream. The Continuity Counter is incremented on each incoming packet with a payload. This 4-bit counter wraps around to 0x0 after it reaches 0xF. The value of the continuity counter maintained by the hardware is compared to the incoming packets. If the values do not match, a PID stream error is signaled.

However, there are two situations where a PID stream error is not signaled. First, an error is not signaled if the discontinuity indicator in the adaptation field is set. In this case, the break in continuity is expected. Second, if two consecutive packets in the transport stream with the same PID have the same continuity counter value, an error is not signaled. This is because in this case one packet is a duplicate of the other. If there is no error in the first packet, the second packet is discarded. If, however, there is an error in the first packet, it is discarded and the second packet is loaded into the packet buffer.

A continuity count error is handled as a PID stream error and is forwarded to the unloaders by setting the error bit in the packet flags field stored with the packet in the packet buffer. The error can also signal an interrupt to the application processor (e.g. through applications port 175).

The continuity field count in non-payload packets is not checked as defined by the MPEG standard. This is because the continuity count is used to insure integrity of the payload data.

Figure 1:
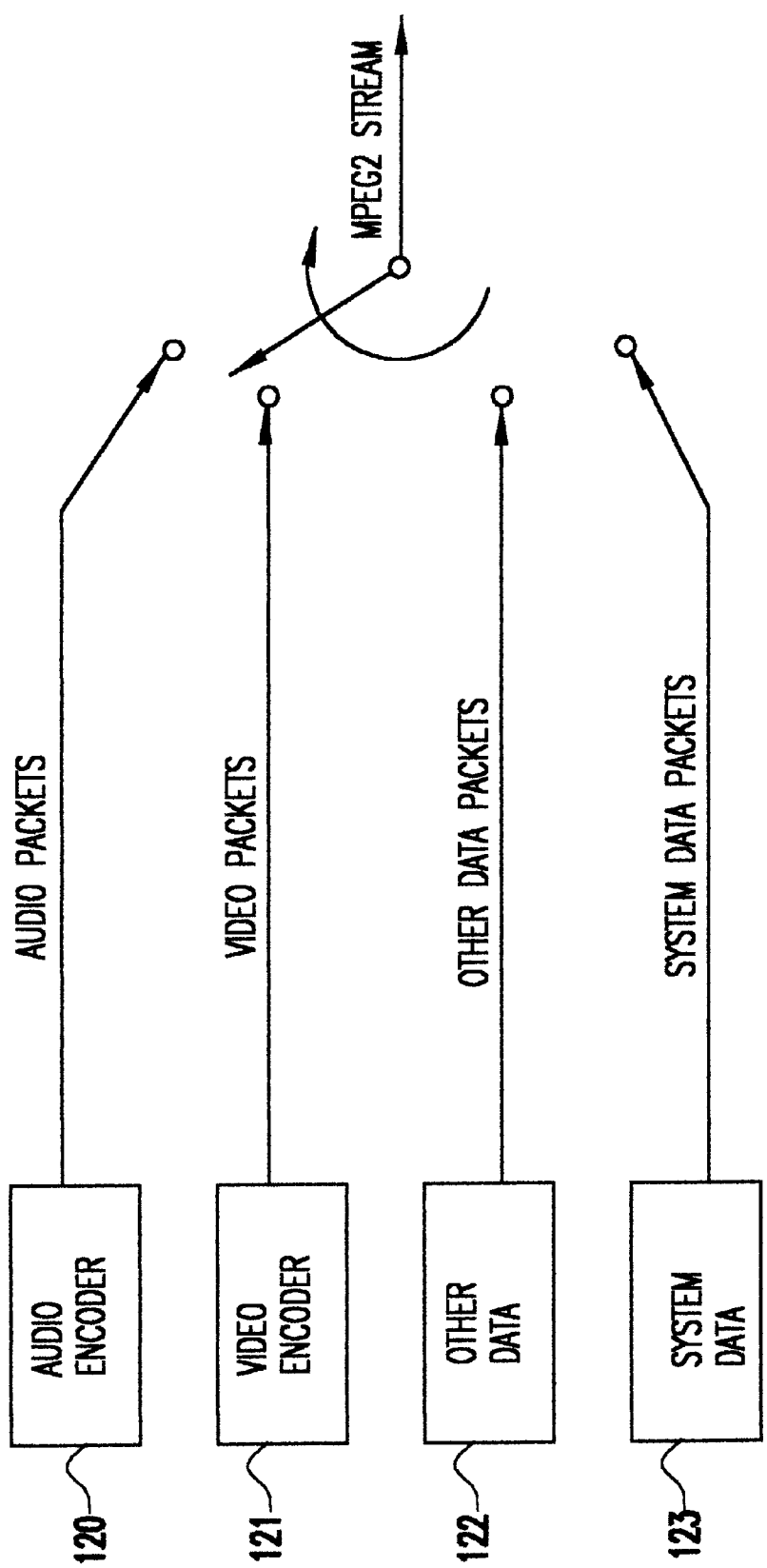
Figure 2:
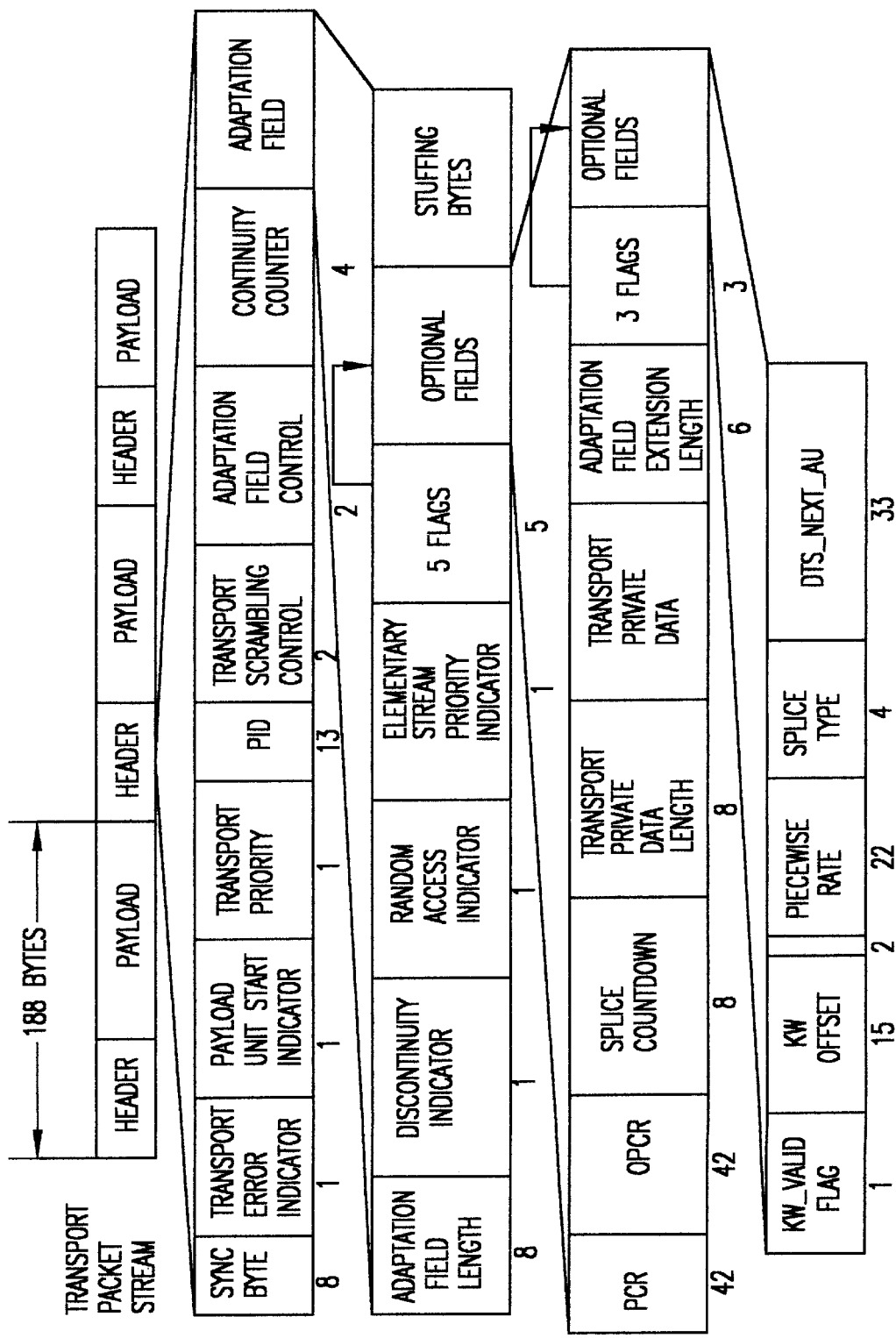
Figure 3:
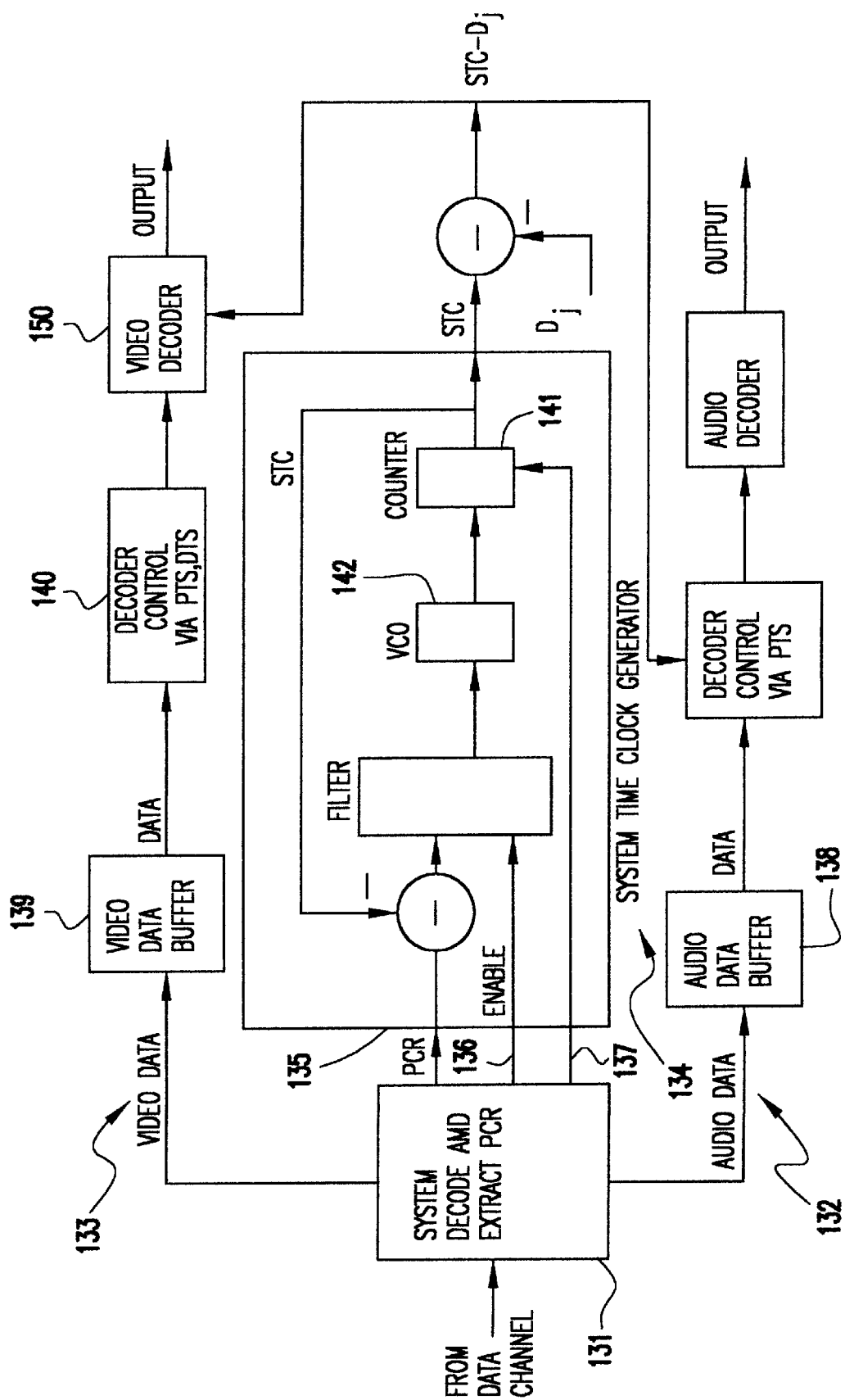
Figure 4:
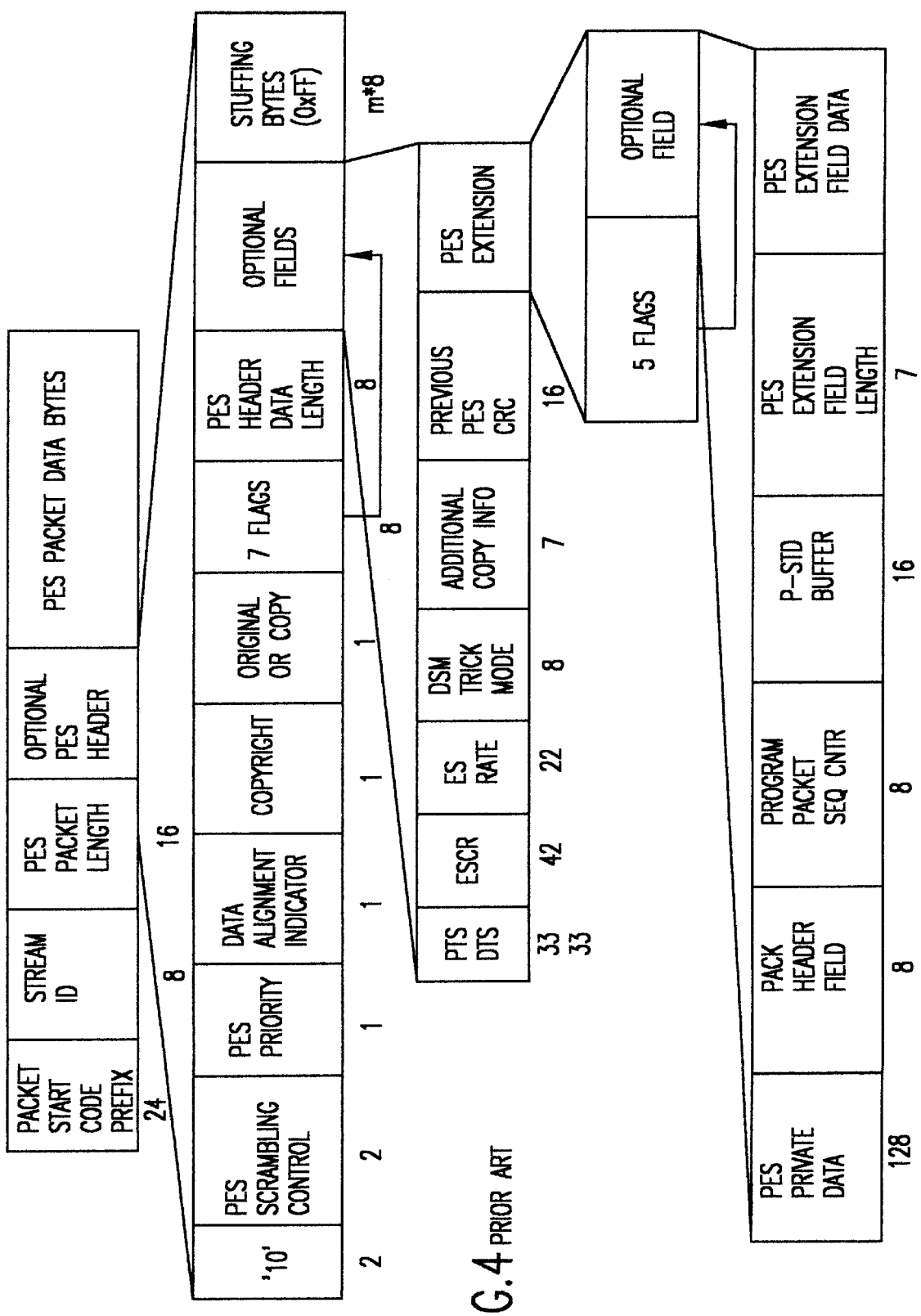
Figure 5:
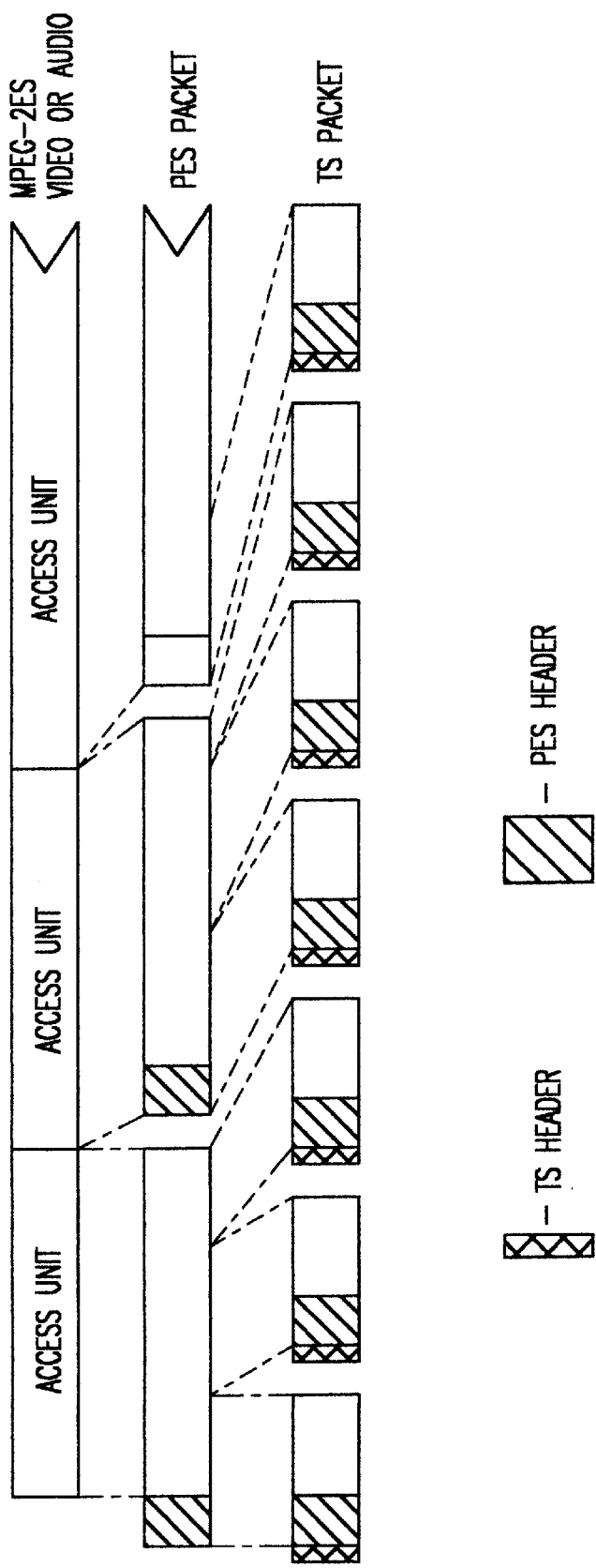

The syntax of the Adaptation Field is shown in FIG. 2. Certain fields in the Adaptation Field are of special interest.

For example, the Adaptation Field Length field indicates the number of byte in the adaptation field following this field. If the Adaptation Field Length Field is greater than 00, then the Adaptation Field Flags are defined. The adaptation field length is used by the unloaders to determine the start of the payload, and to deliver the Adaptation Field to the Memory queues as configured by the application processor.

The first field in the Adaptation Fields is the 1-bit Discontinuity Indicator. This flag indicates two different types of discontinuity, continuity counter and system time base. The discontinuity indicator in the PCR PID indicates a discontinuity in the system time base. The PCR, if present, is loaded into the STC (e.g. under CPU control through Applications port 175). A system time base discontinuity is also signalled to the decoders on the first video or audio packet following the discontinuity. The application or host processor can be interrupted upon the arrival of a discontinuity indicator.

The next field in the Adaptation Fields is the 1-bit random access indicator. The audio and video PIDs can be configured to interrupt the host processor or assist processor upon the arrival of the random access indicator.

The PCR fields are forwarded to the Clock Recovery Unit.

The Splicing Point Flag is parsed and the host can be interrupted upon the arrival of a splicing point.

The Transport Private Data Flag can interrupt the host processor upon the arrival of private field data. Moreover, the Memory queues can be configured to forward the adaptation private data to system memory.

The transport demultiplexor can include an ETSI DVB, or other descrambler. The descrambler implements the appropriate descrambling algorithm, for example ETSI DVB. The host application and/or the transport stream can configure several control fields to control descrambling for each PID index. The Descrambling Control Fields for each PID index include "Enable", which indicates that scrambled packets of PID index are to be descrambled, "KeyID", which indicates which Control Word pair to use for the particular PID index, and "PES/TS" which indicates PES or TS level descrambling for the particular PID index. To be noted is that both PES and TS level scrambling and descrambling can be enabled, although not simultaneously for the same PID.

The descrambler, when present, maintains a constant delay, so that the descrambled data can be delivered with constant delay to an output port. The scramble control bits are modified by the descrambler for packets which are descrambled. Packets which are not configured for descrambling are sent through an aternative data path and recombined after the descrambler.

The descrambler can share resources with the transport demultiplexor. These shared resources can include the application processor interface, the Interrupt register for reporting error conditions, and a logical memory array.

The apparatus of the invention is embodied in a digital MPEG-2 video and audio transport demultiplexor. The transport demultiplexor has apparatus for generating a pulse input to the voltage controlled oscillator. The demultiplexor has an STC counter and a Pulse Control Register. The pulse input to the voltage controlled oscillator is generated by the logically combined output bits of the STC counter and output bits of the pulse control register. Downstream are latch means for latching the combined output bits of the STC counter and output bits of the pulse control register. The output of the latch is recovered for transfer to the voltage controlled oscillator.

Figure 7:
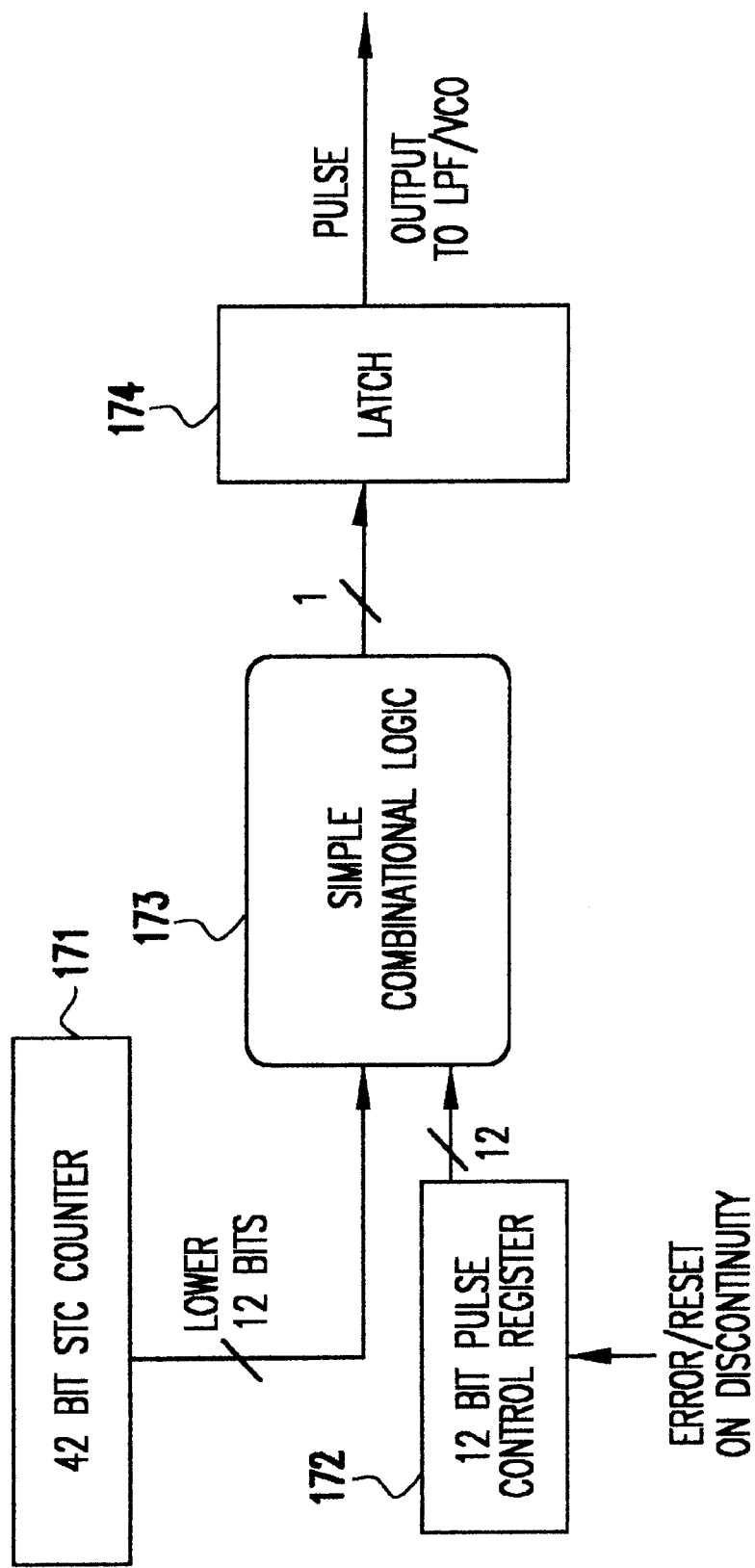
FIG. 7 illustrates apparatus for generating a pulse input to a voltage control oscillator in the clock circuitry of a decoder according to our invention.

The apparatus of the invention is illustrated in FIG. 7. As shown in the FIGURE there are two inputs: a counter 171, as a 42 bit STC counter, and a Pulse Control Register 172, as a 12 bit Pulse Control Register. The outputs of the STC Counter and the Pulse Control Register are logically combined in the Combinational Logic 173. The output of the Combinational Logic is Latched in Latch 174 and is pulse output to a low pass filter and then input as a control voltage to a Voltage Control Oscillator, not shown.

The output of the STC counter is a 42 bit output, and the method of our invention uses the least significant 12 bits of the STC Counter. The output of the pulse control register is also a 12 bit output. The two 12 bit outputs are logically combined, for example, by logically combining the least significant 12 bits of the STC counter with 12 bits of the output of the pulse control register. According to a preferred exemplification of our invention the logical combination of the bits from the STC and the Pulse Control Register is specified by the algorithm shown below, where, Stc_0 is the lower twelve bits of the STC counter, PWM_0 is the twelve bits of the PWM register.

PulseTrain_2 is the pulse stream output, and the other names are temporary variables Train_2(0)<=Stc_0(0);

Train_2(1)<=Stc_0(1) AND (NOT Stc_0(0));

Train_2(2)<=Stc_0(2) AND (NOT Stc_0(1)) AND (NOT Stc_0(0));

Train_2(3)<=Stc_0(3) AND (NOT Stc_0(2)) AND (NOT Stc_0(1)) AND (NOT Stc_0(0));

Train_2(4)<=Stc_0(4) AND (NOT Stc_0(3)) AND (NOT Stc_0(2))

AND (NOT Stc_0(1)) AND (NOT Stc_0(0));

Train_2(5)<=Stc_0(5) AND (NOT Stc_0(4)) AND (NOT Stc_0(3))

AND (NOT Stc_0(2)) AND (NOT Stc_0(1)) AND (NOT Stc_0(0));

Train_2(6)<=Stc_0(6) AND (NOT Stc_0(5)) AND (NOT Stc_0(4))

AND (NOT Stc_0(3)) AND (NOT Stc_0(2)) AND (NOT Stc_0(1)) AND (NOT Stc_0(0));

Train_2(7)<=Stc_0(7) AND (NOT Stc_0(6)) AND (NOT Stc_0(5))

AND (NOT Stc_0(4)) AND (NOT Stc_0(3)) AND (NOT Stc_0(2)) AND (NOT Stc_0(1)) AND (NOT Stc_0(0));

Train_2(8)<=Stc_0(8) AND (NOT Stc_0(7)) AND (NOT Stc_0(6))

AND (NOT Stc_0(5)) AND (NOT Stc_0(4)) AND (NOT Stc_0(3)) AND (NOT Stc_0(2)) AND (NOT Stc_0(1)) AND (NOT Stc_0(0));

Train_2(9)<=Stc_0(9) AND (NOT Stc_0(8)) AND (NOT Stc_0(7))

AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));

Train_2(10)<=Stc_0(10) AND (NOT Stc_0(9)) AND (NOT Stc_0(8))

AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));

Train_2(11)<=Stc_0(11) AND (NOT Stc_0(10)) AND (NOT Stc_0(9))
 AND (NOT Stc_0(8)) AND (NOT Stc_0(7)) AND (NOT Stc_0(6)) AND
 (NOT Stc_0(5)) AND (NOT Stc_0(4)) AND (NOT Stc_0(3)) AND
 (NOT Stc_0(2)) AND (NOT Stc_0(1)) AND (NOT Stc_0(0));
CorrectTerm_2<=PWM_0(4) OR PWM_0(5) OR PWM_0(7) OR PWM_0(9);
Fixup_2<=(PWM_0(3) OR CorrectTerm_2);
—(Ensures the algorithm is monotonic)
Bit_2(0)<=Train_2(0) AND NOT PWM_0(11);
Bit_2(1)<=Train_2(1) AND PWM_0(10);
Bit_2(2)<=Train_2(2) AND PWM_0(9);
Bit_2(3)<=Train_2(3) AND PWM_0(8);
Bit_2(4)<=Train_2(4) AND PWM_0(7);
Bit_2(5)<=Train_2(5) AND PWM_0(6);
Bit_2(6)<=Train_2(6) AND PWM_0(5);
Bit_2(7)<=Train_2(7) AND PWM_0(4);
Bit_2(8)<=Train_2(8) AND Fixup_2;
Bit_2(9)<=Train_2(9) AND (PWM_0(2) OR Fixup_2);
Bit_2(10)<=Train_2(10) AND (PWM_0(1) OR Fixup_2);
Bit_2(11)<=Train_2(11) AND (PWM_0(0) OR Fixup_2);
Bit_2Zero_2<=NOT Bit_2(0) AND NOT Bit_2(1) AND NOT Bit_2(2) AND
 NOT Bit_2(3) AND NOT Bit_2(4) AND NOT Bit_2(5) AND
 NOT Bit_2(6) AND NOT Bit_2(7) AND NOT Bit_2(8) AND
 NOT Bit_2(9) AND NOT Bit_2(10) AND NOT Bit_2(11);
PWMNot7ff_2 ensure that the output is always '1' when the value in the PWM register is 0x7FF.
PWMNot7ff_2<=NOT (NOT PWM_0(11) AND PWM_0(10) AND PWM_0(9) AND
 PWM_0(8) AND PWM_0(7) AND PWM_0(6) AND
 PWM_0(5) AND PWM_0(4) AND PWM_0(3) AND
 PWM_0(2) AND PWM_0(1) AND PWM_0(0));
PulseTrain_2<=(Bit_2Zero_2 AND PWMNot7ff_2);

While packet buffer overflows are unlikely, should a packet buffer overflow occur, the transport demultiplexor of the invention handles the packet buffer overflow by identifying which PID streams were affected and handles the errors the same way a missing packet error is handled.

While the embodiments and exemplifications of our invention have been described and illustrated with respect to one particular standard, the MPEG-2 Standard, it is, of course to be understood the methods and apparatus of our invention can be used with other time division multiplexed and packet multiplexed data streams, having packetized headers and data, including, by way of example, the European Teleocmmunications Standards Institute (ETSI) Digital Video Broadcasting (DVB) standard, the High Definition Television (HDTV) standard, and the Direct Satellite System (DSS) standard, among others.

While the invention has been described with respect to certain preferred embodiments and exemplifications, it is not intended to limited to scope the invention thereby, but solely by the claims appended hereto.

We claim:

1. A method of generating a pulse input to a voltage controlled oscillator of a digital decoder having an STC (System Time Clock) counter and a pulse control register receiving an error signal based on a program clock reference signal, comprising
 generating an output of the STC counter,
 generating an output of the pulse control register,
 logically combining output bits of the STC counter and output bits of the pulse control register to form logically combined output bits,
 latching the logically combined output bits to form a latched pulse output, and
 transferring the latched pulse output to a low pass filter of the voltage controlled oscillator as a variable duty cycle pulse train.

2. The method of claim 1 wherein the output of the STC counter is a 42 bit output, and said method comprises recovering the least significant 12 bits thereof.

3. The method of claim 1 wherein the output of the pulse control register is a 12 bit output.

4. The method of claim 1 comprising logically combining the least significant 12 bits of the STC counter with 12 bits of the output of the pulse control register.

5. The method of claim 1 comprising bitwise logically combining the least significant 12 bits of the STC counter with 12 bits of the output of the pulse control register.

6. The method of claim 5 comprising bitwise logically combining the least significant 12 bits of the STC counter with 12 bits of the output of the pulse control register according to:
 Train_2(0)<=Stc_0(0);
 Train_2(1)<=Stc_0(1) AND (NOT Stc_0(0));
 Train_2(2)<=Stc_0(2) AND (NOT Stc_0(1)) AND (NOT Stc_0(0));
 Train_2(3)<=Stc_0(3) AND (NOT Stc_0(2)) AND (NOT Stc_0(1)) AND (NOT Stc_0(0));
 Train_2(4)<=Stc_0(4) AND (NOT Stc_0(3)) AND (NOT Stc_0(2)) AND (NOT Stc_0(1)) AND (NOT Stc_0(0));
 Train_2(5)<=Stc_0(5) AND (NOT Stc_0(4)) AND (NOT Stc_0(3)) AND (NOT Stc_0(2)) AND (NOT Stc_0(1)) AND (NOT Stc_0(0));
 Train_2(6)<=Stc_0(6) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));
 Train_2(7)<=Stc_0(7) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));
 Train_2(8)<=Stc_0(8) AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));
 Train_2(9)<=Stc_0(9) AND (NOT Stc_0(8)) AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));
 Train_2(10)<=Stc_0(10) AND (NOT Stc_0(9)) AND (NOT Stc_0(8)) AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));
 Train_2(11)<=Stc_0(11) AND (NOT Stc_0(10)) AND (NOT Stc_0(9)) AND (NOT Stc_0(8)) AND (NOT Stc_0(7)) AND (NOT Stc_0(6)) AND (NOT Stc_0

(5)) AND (NOT Stc_0(4)) AND (NOT Stc_0(3)) AND (NOT Stc_0(2)) AND (NOT Stc_0(1)) AND (NOT Stc_0(0));
CorrectTerm_2<=PWM_0(4) OR PWM_0(5) OR PWM_0(7) OR PWM_0(9);
Fixup_2<=(PWM_0(3) OR CorrectTerm_2);
Bit_2(0)<=Train_2(0) AND NOT PWM_0(11);
Bit_2(1)<=Train_2(1) AND PWM_0(10);
Bit_2(2)<=Train_2(2) AND PWM_0(9);
Bit_2(3)<=Train_2(3) AND PWM_0(8);
Bit_2(4)<=Train_2(4) AND PWM_0(7);
Bit_2(5)<=Train_2(5) AND PWM_0(6);
Bit_2(6)<=Train_2(6) AND PWM_0(5);
Bit_2(7)<=Train_2(7) AND PWM_0(4);
Bit_2(8)<=Train_2(8) AND Fixup_2;
Bit_2(9)<=Train_2(9) AND (PWM_0(2) OR Fixup_2);
Bit_2(10)<=Train_2(10) AND (PWM_0(1) OR Fixup_2);
Bit_2(11)<=Train_2(11) AND (PWM_0(0) OR Fixup_2);
Bit_2Zero_2<=NOT Bit_2(0) AND NOT Bit_2(1) AND NOT Bit_2(2) AND NOT Bit_2(3) AND NOT Bit_2(4) AND NOT Bit_2(5) AND NOT Bit_2(6) AND NOT Bit_2(7) AND NOT Bit_2(8) AND NOT Bit_2(9) AND NOT Bit_2(10) AND NOT Bit_2(11);
PWMNot7ff_2<=NOT (NOT PWM_0(11) AND PWM_0(10) AND PWM_0(9) AND PWM_0(8) AND PWM_0(7) AND PWM_0(6) AND PWM_0(5) AND PWM_0(4) AND PWM_0(3) AND PWM_0(2) AND PWM_0(1) AND PWM_0(0));
PulseTrain_2<=(Bit_2Zero_2 AND PWMNot7ff_2);
where,
Stc_0 is the lower twelve bits of the STC counter,
PWM_0 is the twelve bits of the PWM register,
PulseTrain_2 is the pulse stream output, and
the other names are temporary variables,
Fixup_2<=(PWM_0(3) OR CorrectTerm_2) ensures the algorithm is monotonic), and
PWMNot7ff_2 ensure that the output is always '1' when the value in the PWM register is 0×7FF.

7. A method of generating a pulse input to a voltage controlled oscillator of a digital decoder, said decoder having a System Time Clock (STC) counter having a 42 bit output and a Pulse Control Register having a 12 bit output, comprising generating the 42 bit output of the STC counter and generating the 12 bit output of the Pulse Control Register, bitwise logically combining the 12 least significant output bits of the STC counter and the 12 output bits of the pulse control register, latching the ANDed output bits of the STC counter and output bits of the pulse control register, and recovering the latched pulse output thereof as a pulse train for transfer to the voltage controlled oscillator.

8. The method of claim 7 comprising logically combining the least significant 12 bits of the STC counter with 12 bits of the output of the pulse control register according to:
Train_2(0)<=Stc_0(0);
Train_2(1)<=Stc_0(1) AND (NOT Stc_0(0));
Train_2(2)<=Stc_0(2) AND (NOT Stc_0(1)) AND (NOT Stc_0(0));
Train_2(3)<=Stc_0(3) AND (NOT Stc_0(2)) AND (NOT Stc_0(1)) AND (NOT Stc_0(0));
Train_2(4)<=Stc_0(4) AND (NOT Stc_0(3)) AND (NOT Stc_0(2)) AND (NOT Stc_0(1)) AND (NOT Stc_0(0));
Train_2(5)<=Stc_0(5) AND (NOT Stc_0(4)) AND (NOT Stc_0(3)) AND (NOT Stc_0(2)) AND (NOT Stc_0(1)) AND (NOT Stc_0(0));
Train_2(6)<=Stc_0(6) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));
Train_2(7)<=Stc_0(7) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));
Train_2(8)<=Stc_0(8) AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));
Train_2(9)<=Stc_0(9) AND (NOT Stc_0(8)) AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));
Train_2(10)<=Stc_0(10) AND (NOT Stc_0(9)) AND (NOT Stc_0(8)) AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));
Train_2(11)<=Stc_0(11) AND (NOT Stc_0(10)) AND (NOT Stc_0(9)) AND (NOT Stc_0(8)) AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));
CorrectTerm_2<=PWM_0(4) OR PWM_0(5) OR PWM_0(7) OR PWM_0(9);
Fixup_2<=(PWM_0(3) OR CorrectTerm_2);
Bit_2(0)<=Train_2(0) AND NOT PWM_0(11);
Bit_2(1)<=Train_2(1) AND PWM_0(10);
Bit_2(2)<=Train_2(2) AND PWM_0(9);
Bit_2(3)<=Train_2(3) AND PWM_0(8);
Bit_2(4)<=Train_2(4) AND PWM_0(7);
Bit_2(5)<=Train_2(5) AND PWM_0(6);
Bit_2(6)<=Train_2(6) AND PWM_0(5);
Bit_2(7)<=Train_2(7) AND PWM_0(4);
Bit_2(8)<=Train_2(8) AND Fixup_2;
Bit_2(9)<=Train_2(9) AND (PWM_0(2) OR Fixup_2);
Bit_2(10)<=Train_2(10) AND (PWM_0(1) OR Fixup_2);
Bit_2(11)<=Train_2(11) AND (PWM_0(0) OR Fixup_2);
Bit_2Zero_2<=NOT Bit_2(0) AND NOT Bit_2(1) AND NOT Bit_2(2) AND NOT Bit_2(3) AND NOT Bit_2(4) AND NOT Bit_2(5) AND NOT Bit_2(6) AND NOT Bit_2(7) AND NOT Bit_2(8) AND NOT Bit_2(9) AND NOT Bit_2(10) AND NOT Bit_2(11);
PWMNot7ff_2<=NOT (NOT PWM_0(11) AND PWM_0(10) AND PWM_0(9) AND PWM_0(8) AND PWM_0(7) AND PWM_0(6) AND PWM_0(5) AND PWM_0(4) AND PWM_0(3) AND PWM_0(2) AND PWM_0(1) AND PWM_0(0));
PulseTrain_2<=(Bit_2Zero_2 AND PWMNot7ff_2);
where,
Stc_0 is the lower twelve bits of the STC counter,
PWM_0 is the twelve bits of the PWM register, PulseTrain_2 is the pulse stream output, and the other names are temporary variables, Fixup_2<=(PWM_0(3) OR CorrectTerm_2) ensures the algorithm is monotonic), and PWMNot7ff_2 ensure that the output is always '1' when the value in the PWM register is 0x7FF.

9. A digital decoder having a voltage controlled oscillator and apparatus for generating a pulse input to the voltage controlled oscillator, said decoder comprising an STC (System Time Clock) counter, a pulse control register receiving an error signal based on a program clock reference signal, means for logically combining output bits of the STC counter and output bits of the pulse control register, latch means for latching the result of combining the result of combining bits of the STC counter and the pulse control register, and means for transferring the latched pulse output to a low pass filter of the voltage controlled oscillator as a variable duty cycle pulse train.

10. The digital decoder of claim 9 wherein the means for logically combining output bits of the STC counter and output bits of the pulse control register comprise means for bitwise logically combining the least significant 12 bits of the STC counter with 12 bits of the output of the pulse control register.

11. The digital decoder of claim 10 wherein the means for bitwise logically combining the least significant 12 bits of the STC counter with 12 bits of the output of the pulse control register comprise combinatorial means according to:

Train_2(0)<=Stc_0(0);

Train_2(1)<=Stc_0(1) AND (NOT Stc_0(0));

Train_2(2)<=Stc_0(2) AND (NOT Stc_0(1)) AND (NOT Stc_0(0));

Train_2(3)<=Stc_0(3) AND (NOT Stc_0(2)) AND (NOT Stc_0(1)) AND (NOT Stc_0(0));

Train_2(4)<=Stc_0(4) AND (NOT Stc_0(3)) AND (NOT Stc_0(2)) AND (NOT Stc_0(1)) AND (NOT Stc_0(0));

Train_2(5)<=Stc_0(5) AND (NOT Stc_0(4)) AND (NOT Stc_0(3)) AND (NOT Stc_0(2)) AND (NOT Stc_0(1)) AND (NOT Stc_0(0));

Train_2(6)<=Stc_0(6) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));

Train_2(7)<=Stc_0(7) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));

Train_2(8)<=Stc_0(8) AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));

Train_2(9)<=Stc_0(9) AND (NOT Stc_0(8)) AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));

Train_2(10)<=Stc_0(10) AND (NOT Stc_0(9)) AND (NOT Stc_0(8)) AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(0));

Train_2(11)<=Stc_0(11) AND (NOT Stc_0(10)) AND (NOT Stc_0(9)) AND (NOT Stc_0(8)) AND (NOT Stc_0(7)) AND (NOT Stc_0(6)) AND (NOT Stc_0(5)) AND (NOT Stc_0(4)) AND (NOT Stc_0(3)) AND (NOT Stc_0(2)) AND (NOT Stc_0(1)) AND (NOT Stc_0(3));

CorrectTerm_2<=PWM_0(4) OR PWM_0(5) OR PWM_0(7) OR PWM_0(9);

Fixup_2<=(PWM_0(3) OR CorrectTerm_2);

Bit_2(0)<=Train_2(0) AND NOT PWM_0(11);

Bit_2(1)<=Train_2(1) AND PWM_0(10);

Bit_2(2)<=Train_2(2) AND PWM_0(9);

Bit_2(3)<=Train_2(3) AND PWM_0(8);

Bit_2(4)<=Train_2(4) AND PWM_0(7);

Bit_2(5)<=Train_2(5) AND PWM_0(6);

Bit_2(6)<=Train_2(6) AND PWM_0(5);

Bit_2(7)<=Train_2(7) AND PWM_0(4);

Bit_2(8)<=Train_2(8) AND Fixup_2;

Bit_2(9)<=Train_2(9) AND (PWM_0(2) OR Fixup_2);

Bit_2(10)<=Train_2(10) AND (PWM_0(1) OR Fixup_2);

Bit_2(11)<=Train_2(11) AND (PWM_0(0) OR Fixup_2);

Bit_2Zero_2<=NOT Bit_2(0) AND NOT Bit_2(1) AND NOT Bit_2(2) AND NOT Bit_2(3) AND NOT Bit_2(4) AND NOT Bit_2(5) AND NOT Bit_2(6) AND NOT Bit_2(7) AND NOT Bit_2(8) AND NOT Bit_2(9) AND NOT Bit_2(10) AND NOT Bit_2(11);

PWMNot7ff_2<=NOT (NOT PWM_0(11) AND PWM_0(10) AND PWM_0(9) AND PWM_0(8) AND PWM_0(7) AND PWM_0(6) AND PWM_0(5) AND PWM_0(4) AND PWM_0(3) AND PWM_0(2) AND PWM_0(1) AND PWM_0(0));

PulseTrain_2<=(Bit_2Zero_2 AND PWMNot7ff_2);

where,

Stc_0 is the lower twelve bits of the STC counter,

PWM_0 is the twelve bits of the PWM register,

PulseTrain_2 is the pulse stream output, and the other names are temporary variables, Fixup_2<=(PWM_0(3) OR CorrectTerm_2) ensures the algorithm is monotonic), and PWMNot7ff_2 ensure that the output is always '1' when the value in the PWM register is 0x7FF.

* * * * *